United States Patent [19]

Crampton

[11] Patent Number: 4,760,322
[45] Date of Patent: Jul. 26, 1988

[54] POWER-SUPPLY/BATTERY BACK-UP POWER SUPPLY/BATTERY CHARGER COMBINATION

[75] Inventor: Timothy P. Crampton, Marietta, Ga.

[73] Assignee: Applied Research & Technology, Inc., Atlanta, Ga.

[21] Appl. No.: 3,649

[22] Filed: Jan. 15, 1987

Related U.S. Application Data

[63] Continuation of Ser. No. 769,358, Aug. 26, 1985, Pat. No. 4,672,293.

[51] Int. Cl.⁴ .............................. H02J 7/00; H02J 9/00
[52] U.S. Cl. ........................................... 320/14; 307/66
[58] Field of Search ............................. 320/14; 307/66

[56] References Cited

U.S. PATENT DOCUMENTS 4,672,293  6/1987  Crampton ............................. 320/14

Primary Examiner—R. J. Hickey
Attorney, Agent, or Firm—Louis T. Isaf

[57] ABSTRACT

A. Power supply comprising an AC to DC power supply and a DC to DC power supply and a DC battery charging circuit within a single device, which device provides continuous DC power to a load regardless of the presence or absence of the AC power source.

3 Claims, 1 Drawing Sheet

POWER-SUPPLY/BATTERY BACK-UP POWER SUPPLY/BATTERY CHARGER COMBINATION

This application is a continuation of application Ser. No. 769,358 filed Aug. 26, 1985 now U.S. Pat. No. 4,672,293.

FIELD OF THE INVENTION

This invention relates generally to the field of power supplies for electronics equipment and more specifically for back-up power supplies for maintaining electronics components in the absence of an AC current, as in a power outage.

BACKGROUND OF THE INVENTION

It has, for years, been the desire of most technicians to provide a battery back-up system for computers and other sensitive technology which lose memory or other features when the power source is interrupted. In an effort to respond to this need, sophisicated, complex systems have been developed which include separate AC power sources, separate DC battery power sources and a battery charging circuit supplementing the battery source. In addition, complex systems have been needed to sense current loss in the AC system, signal such current loss and switch in the battery power circuit.

The prior art has its disadvantages in that multiple systems required consume an undesirable amount of space, the separate circuitry is undesirably expensive and there always exist the risk of current loss or power droppage during the switch over from the AC source to the DC battery source.

BRIEF SUMMARY OF THE INVENTION

Briefly described, the present invention comprises a power supply for interfacing between an AC power source and a power driven piece of equipment; which power supply provides for a regulated DC output to equipment from two possible sources. The possible power sources of the present invention are (1) rectified, DC output from an AC power source and (2) DC output from a DC battery power source. Unique to the present invention is the fact that the regulated, DC output is provided through the same device, which is the device of the present invention, whether the power source be the AC power source or the battery power source.

A single circuitry, being the device circuitry of the present invention, provides a battery charging circuit in parallel with the rectifying circuit of the AC power source for providing constant battery charging to the DC battery at all times while the AC power source is providing the output power to the equipment. Yet, it is the same, single circuitry of the present invention which immediately provides battery powered output to the equipment when the AC power source is absent, which battery power is provided through the same regulating circuit as is the AC power.

Therefore, it is an object of the present invention to provide a combination AC power source/DC battery power source/battery charger power supply device which provides almost instantaneous take over by the battery power source upon absence of the AC power source without the need for complex sensing and signaling circuits.

Another object of the present invention is to provide a battery charging/battery back-up power source circuit which receives its battery charging power direct from the same rectified circuit which supplies the regulated DC output to the equipment from the AC power source; and the back-up battery power provides DC power to the equipment through the same rectified circuit as does the AC power source.

Yet another object of the present invention is to provide an AC source/DC battery source/battery charging device for providing a continuously charged battery back-up for sensitive, power-needy equipment which device is portable, easy to install and relatively inexpensive.

Other objects, features and advantages of the present invention will become apparent upon reading and understanding this specification when taken in conjunction with the accompanying drawings.

DETAILED DESCRIPTION OF THE PREFERRED EMBODIMENTS

Figure 1:
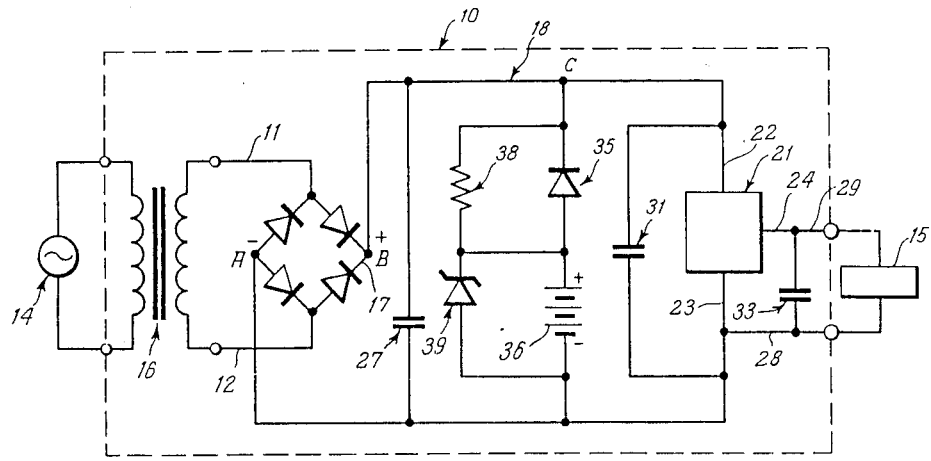
FIG. 1 is an electrical schematic showing the AC power supply/DC battery back-up power supply/battery charger combination in accordance with the present invention.

Referring now in greater detail to the drawings, FIG. 1 depicts the AC power supply/DC battery back-up power supply/battery charger device 10 of the present invention. The combination device 10 of the present invention comprises, in its preferred embodiments, the circuitry and components shown in FIG. 1, except that the AC power source 14 is not a component part of the present invention but rather a source of power, such as a wall socket, to which the device 10 of the present invention is connected by, for example, a plug. Furthermore, load 15 is not a component part of the present combination device 10, but rather is a power needy electronic load such as a computer electronics circuit or circuit board.

The combination device 10 of the present invention comprises a circuit developed about two lead wires 11, 12 by which the combination device 10 is connected in series with an AC power source 14. The AC power source 14 could, for example, be a 120 volt, 240 volt or other AC power source available to the user. It is understood that a transformer 16 is, in some embodiments, used to create a desired, isolated AC input. To make the invention versatile, the transformer 16 of desired specification is included within the circuitry of preferred embodiments of the present invention.

Components found in the preferred embodiment of the combination device 10 of FIG. 1 include a full wave, single phase bridge rectifier 17 placed in the series circuit of wires 11, 12 for series connection with the AC power source 14. The rectifier 17 is of a type typically known in the art, and, in typical manner, a branch of unidirectional current is created in the rectifier 17 between points A and B and this branch shall, for purposes of this disclosure, be termed the unidirectional branch (UD branch) 18. For ease of examination, the UD branch 18 has been drawn outside of the rectifier diamond (to the right side of point B), but is understood that all elements of device 10 drawn to the right side of point B exist in reality between points A and B. Positioned in the UD branch 18 is a voltage regulator 21. The regulator 21 is connected within the UD branch at a current input lead 22 and a ground lead 23. The regulator 27 is also provided with a DC output lead 24. A first capacitor 27 is placed in the UD branch 18 in parallel with the regulator. A load connecting ground wire 28 is connected to the UD branch 18 between the regulator 21 and point A at the regulator ground lead 23. A load connecting power lead 29 is connected to the regulator DC output lead 24, such that the two load connecting leads 28 and 29 provide means for connecting the combination device 10 to a load 15.

The previously described combination of rectifier 17, UD branch 18, regulator 21 and first capacitor 27 is a combination of elements which shall be termed the AC power supply, through which the present device delivers regulated, rectified DC power to the load 15 from an alternating current source 14.

Positioned in the UD branch 18 between two points marked C and D, is, what shall be termed, the battery charging circuit of the present invention. As seen, the battery charging circuit comprises a steering diode 35 in parallel with the regulator 21. In series with the steering diode 35 is a DC battery 36 power source which is, likewise, in parallel with the regulator 21. A resistor 38 is placed in the battery charging circuit in parallel combination with the diode 35 and a zener diode 39 is placed in parallel combination with the battery 36 such that the parallel combination of zener diode 39 and battery 36 is in series with the parallel combination of steering diode 35 and resistor 38.

Choosing circuit element specifications. When choosing the values of certain key elements of the combination power supply device 10 circuitry, and in developing different circuit arrangements which may have equivalent functions and which are within the scope of the present invention, the following rules and descriptions regarding the present invention should be born in mind. These rules and descriptions should not be considered exhaustive of the functions and relationships of the elements of the present invention; nor are the elements listed in A–G below to be considered the only "key" elements of the invention.

A. Once a required voltage output to the load 15 is determined, a regulator (or regulating circuit) 21 is chosen which provides the needed output.

B. The regulator 21 is chosen to provide a constant, stable Voltage output (Vo) from a range of allowable input voltages. The range of allowable input voltages must include at least a minimum Voltage input [$V_{imin(allowed)}$] which is equal to or less than the output voltage of battery 36; and the range must include at least a maximum allowed Voltage input [$V_{imax(allowed)}$] which is equal to or greater than the required charging voltage of battery 36. Thus, available batteries and regulators must be matched to meet the above requirements.

C. Furthermore, in the preferred embodiments, the present invention teaches the use of the lowest possible voltage input to voltage output ratio for the regulator 21. This results in a relatively low heat dissipation. Thus, in the preferred embodiments, the invention calls for choosing of a regulator whose minimum allowable input voltage [$V_{imin(allowed)}$] is less than or equal to the desired output voltage (Vo) plus 2 volts [$V_{imin(allowed)}$ $V_o + 2$ V]. An example of such a regulator is listed in the example specs below.

D. Preferrably, a battery 36 with low output voltage and relatively low charging voltage, fitting within the regulator voltage range, is matched with the regulator so that the combination maintains minimum and maximum voltage input to voltage output ratios which are as low as possible. This facilitates the desired result of low heat dissipation.

E. The AC source 14 is ascertained, and stepped up or down by transformer 16 where necessary, to provide an AC voltage to the device 10 which exceeds the battery 36 charging voltage yet remains within the range of allowable regulator 21 input voltages.

F. Resistor 38 is chosen in light of the charging current required by Battery 36, as per its manufacturer's specifications. In the preferred embodiments, the resistor 38 is sized to affect a "float charge" of the battery as per its specs. In other embodiments, modifications are made to effect brut force or dual rate charging.

G. Zener Diode 39 is chosen in light of the maximum charging voltage allowed by the battery 36, as per its manufacturer's specifications. In the preferred embodiments, "float charge" is being affected.

Although the values of the circuit elements may vary for different applications, including applications utilizing higher current and voltages, the following specifications represent a presently desirable example of the preferred embodiment:

| | |
|---|---|
| AC power supply (14) | 115 VAC office wall socket |
| Transformer (16) | input 115 VAC; out 9.5 VAC; |
| Bridge rectifier (17) | Bridge @ 2 Amp; Full wave single phase |
| Voltage regulator (21) | SGS-AGES part #L387; Low voltage drop; 5 volts DC @ 500 milliamps output; 5.9 to 28 volt input voltage DC |
| First capacitor (27) | 2200 micro-farad, 16 V |
| Second capacitor (31) | 0.1 microfarad |
| Third capacitor (33) | 100 microfarad |
| Steering diode (35) | 2 Amp Schottky |
| Battery (36) | 6 V; lead acid type; 6.8 V float charge voltage; 100–250 milliamp float charge current |
| Resistor (38) | 47 ohm; 3 watt |
| Zener doide (39) | 6.8 VDC |
| DC output to Load | 5 VDC @ 500 milliamp max. |

Operation of the preferred embodiment. The combination power supply 10 of the present invention, as seen in the preferred embodiment of the figure, performs its function as follows. Lead wires 11, 12, in the form of a utility plug, are connected to an AC power source 14 through, for example, a wall socket. A load 15, such as a computer electronics board, is connected to the combination device 10 at the load connecting leads, 28, 29. Alternating current and power enters the device 10 at wire leads 11, 12, is transformed by transformer 16 to the desired isolated 9.5 AC, and is rectified by bridge rectifier 17 to create a unidirectional current in the UD branch 18. Unidirectional current is regulated by regulator 21 to create a regulated, rectified, DC current and voltage at the regulator output lead 24 such that current and voltage developed across regulator output lead 24 and the ground lead 23 (UD branch 18) is an acceptable DC power for servicing the computer board 15. Thus, the combination device 10 through the AC power source power supply portion of the invention has provided a regulated, rectified, DC power to a load 15 from an AC source 14. The various capacitors 27, 31 and 33 perform the following functions, in the preferred embodiment: capacitor 27 functions as a filter/voltage buffer to assist in eliminating noise passing from the AC source 14 and/or transformer 16 and to assist in smoothing out minor voltage fluctuations. Capacitors 31 and 33 function as high frequency filter capacitors in the regulator circuit.

At the same time that rectified, unidirectional current is being supplied through the UD branch 18 to regulator 21, current and voltage are being supplied to the battery charging circuit of the combination device 10. As the unidirectional current flows from point C to point D through the battery charging circuit, the steering diode 35 forces the current to flow across resistor 38 which resistor acts as a current limiting resistor for purposes of defining the current flow through the battery 36 during charging. Zener diode 39 functions as a voltage limiter for purposes of defining the voltage across battery 36 during charging. The resistor 38 and zener diode 39 are sized, as previously expressed, to insure charging current and voltage in accordance with the manufacturers specifications for battery 36.

Thus, the combination device 10 of the present invention functions to provide a battery charging circuit for charging a DC battery 36 from an AC power source 14 while simultaneously providing a regulated, rectified, DC power to a load 15 from the same AC power source 14.

In the event of AC power loss such that the combination device 10 is no longer receiving power from the AC power source 14, the battery 36 immediately begins discharging to provide power through the UD branch 18. Since the unidirectional current derived from AC power source 16 is no longer present, the battery current flows direct through the steering diode 35 to UD branch 18 through regulator 21 to provide the required regulated, DC power to the load 15 through load connecting leads 28, 29. Thus, the load senses no loss or disturbance of power as it always receives its power directly from the combination device 10 of the present invention and only the combination device 10 is aware of whether the output power has been generated by the AC power source 14 or the DC battery source 36.

Once the AC power source 14 is restored, the unidirectional current again fills the UD branch with voltage sufficient to charge the battery 36, and thus surpress output by the battery, in which case, the output power to the load 15 is again being provided by the AC power source 14 which, again, is simultaneously charging the battery 36.

Regulator output to load 15 is a constant 5 volts DC (for the embodiment of the herein disclosed example) for variable inputs. Therefore, there the AC power source 14 to exceed the battery output voltage and thus equal or exceed the battery charging voltage, while at the same time not exceeding the regulator 21 specifications for maximum input voltage. Thus, the battery output voltage can be lower than the unidirectional voltage supplied by the AC power source 14; but, both voltages (battery supplied voltage or AC power source supplied voltage) are within the regulators voltage input range to thus provide the exact same voltage output to load 15.

Figure 2:
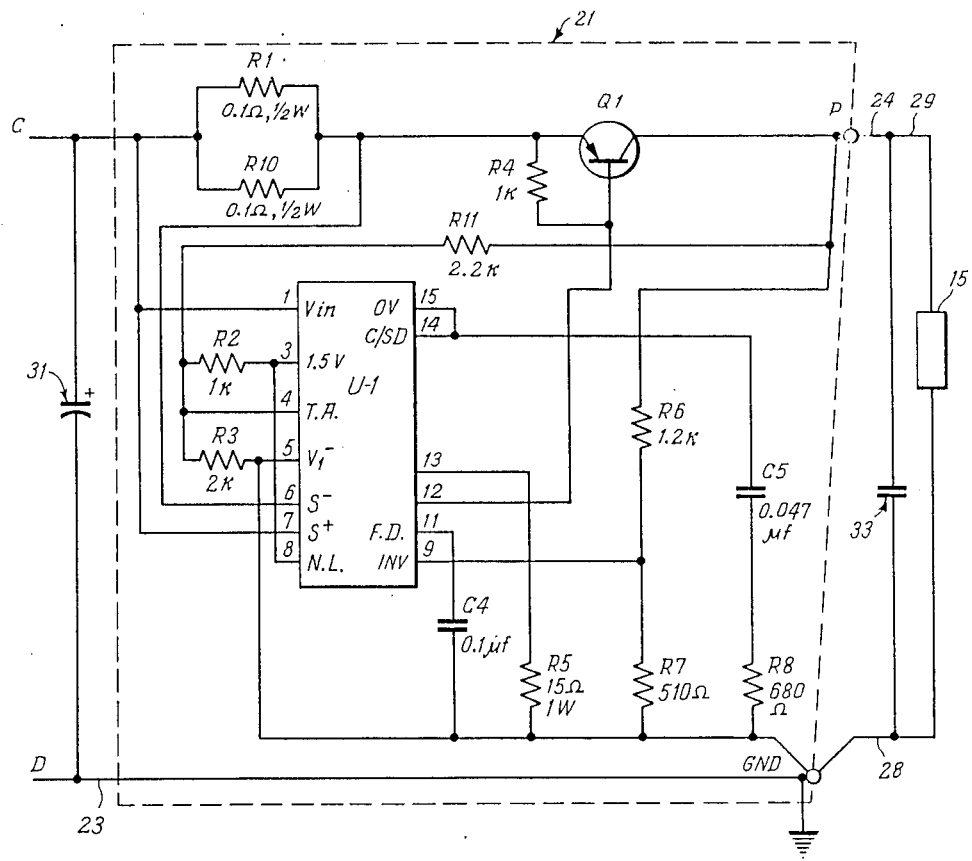

Whereas, the present invention has been described with specific reference to a regulator 21 in the form of a single component, it is understood that the term "regulator" includes a regulator circuit 21 having more than one component when such a circuit is recommended by the regulator manufacturer or others in the industry to accomplish a desired voltage input to voltage output ratio. (See example of FIG. 2.)

Whereas the present invention has been described with specific reference to linear power supply technology, it is understood that the present invention relates also to "switcher" power supply technology. In which cases, the term "regulator" or "regulator circuit" refers to any circuit which stabilizes an output voltage and/or current while manifesting the characteristics of the regulator 21 set out in the foregoing disclosure.

Whereas the present invention has been described in specific detail with particular reference to the preferred embodiments thereof, it will be understood that variations and modifications can be effected within the spirit and scope of the invention as described hereinbefore and as defined in the appended claims.

I claim:

1. A combination power supply—battery backup power supply—battery charger, comprising:
   an AC power source, including a transformer means for providing a predetermined AC voltage;
   a rectification means placed in an AC circuit with said AC power source for providing a unidirectional current in a DC branch within said AC circuit;
   a regulating means positioned in said DC branch for providing a regulated DC output, said regulating means being characterized by a low input to output ratio such that the minimum allowable input voltage to said regulating means is less than or equal to the output voltage of said regulating means plus two volts;
   a DC power source comprising a battery within said DC branch;
   said battery being characterized by a discharge voltage which is less than or equal to the output voltage of said regulating means plus two volts; and
   a battery charging circuit positioned in said unidirectional branch with said regulating means, said battery charging circuit comprising said battery within said circuit, said battery being further characterized by a charging voltage which is less than or equal to one hundred twenty-five percent (125%) of said battery discharge voltage,
   whereby the voltage from the transformer means simultaneously serves as input voltage to the regulating means for supply to a load and as charging voltage to charge the battery with the charging circuit, and the battery provides voltage within defined limits as input voltage to the regulating means in the absence of power from the AC power source.

2. A combination power supply—battery backup power supply—battery charger, comprising:
   AC/DC conversion means for converting AC power to rectified DC power at a predetermined voltage;
   a DC branch including conducting means for conducting said DC power;
   a regulating means positioned in said DC branch for converting said rectified DC output to a regulated DC output, said regulating means being characterized by a low input to output ratio such that the minimum allowable input voltage to said regulating means is less than or equal to the output voltage of said regulating means plus two volts;
   a DC power source comprising a battery within said DC branch;
   said battery being characterized by a discharge voltage which is less than or equal to the output voltage of said regulating means plus two volts; and
   a battery charging circuit positioned in said DC branch with said regulating means, said battery charging circuit comprising said battery within said circuit, said battery being further characterized by a charging voltage which is less than or equal to one hundred twenty-five percent (125%) of said battery discharge voltage, whereby the voltage from the AC/DC conversion means simultaneously serves as input voltage to the regulating means for supply to a load and as charging voltage to charge the battery with the charging circuit, and the battery provides voltage within defined limits as input voltage to the regulating means in the absence of power from the AC power source.

3. A combination power supply—battery backup power supply—battery charger, comprising:

AC/DC conversion means for converting AC power to rectified DC power at a predetermined voltage;

a DC branch including conducting means for conducting said DC power;

a regulating means positioned in said DC branch for converting said rectified DC output to a regulated DC output, said regulating means being characterized by a low input to output ratio such that the minimum allowable input voltage to said regulating means is less than or equal to the output voltage of said regulating means plus two volts;

a DC power source comprising a battery within said DC branch;

said battery being characterized by a discharge voltage which is less than or equal to the output voltage of said regulating means plus two volts; and a battery charging circuit positioned in said DC branch with said regulating means, said battery charging circuit comprising said battery within said circuit, whereby the voltage from the AC/DC conversion means simultaneously serves as input voltage to the regulating means for supply to a load and as charging voltage to charge the battery with the charging circuit, and the battery provides voltage within defined limits as input voltage to the regulating means in the absence of power from the AC power source.

* * * * *